United States Patent [19]

Lavengood et al.

[11] Patent Number: 5,227,428

[45] Date of Patent: * Jul. 13, 1993

[54] RUBBER MODIFIED NYLON COMPOSITION

[75] Inventors: Richard E. Lavengood, Longmeadow; Allen R. Padwa, Worcester; Alva F. Harris, Wilbraham, all of Mass.

[73] Assignee: Monsanto Company, St. Louis, Mo.

[*] Notice: The portion of the term of this patent subsequent to Dec. 15, 2004 has been disclaimed.

[21] Appl. No.: 823,005

[22] Filed: Jan. 15, 1992

Related U.S. Application Data

[60] Continuation of Ser. No. 363,341, Jun. 2, 1989, abandoned, which is a continuation of Ser. No. 132,234, Dec. 14, 1987, abandoned, which is a division of Ser. No. 842,338, Mar. 21, 1986, Pat. No. 4,713,415, which is a continuation-in-part of Ser. No. 733,560, May 10, 1985, abandoned.

[51] Int. Cl.$^5$ .............................................. C08L 77/00
[52] U.S. Cl. ...................................... 525/66; 525/179
[58] Field of Search ........................................... 525/66

[56] References Cited

U.S. PATENT DOCUMENTS

| | | | |
|---|---|---|---|
| 4,421,892 | 12/1983 | Kasahara et al. | 524/514 |
| 4,713,415 | 12/1987 | Lavengood et al. | 525/66 |
| 5,071,910 | 12/1991 | Scheppers et al. | 525/66 |
| 5,089,557 | 2/1992 | Henton et al. | 525/66 |

FOREIGN PATENT DOCUMENTS

| | | |
|---|---|---|
| 0068132 | 5/1982 | European Pat. Off. |
| 5448850 | 9/1977 | Japan |

Primary Examiner—Ana L. Carrillo
Attorney, Agent, or Firm—Thomas E. Kelley; Mark F. Wachter; William J. Farrington

[57] ABSTRACT

A polyamide composition of improved impact comprising a blend of components (A) 5 to 79.5 weight percent of a graft rubber composition of a graft polymer of methyl (meth)acrylate and/or (meth)acrylonitrile and a vinylaromatic monomer grafted onto a substrate rubber, (B) 94.5 to 20 weight percent of a polyamide resin, and (C) 0.5 to 60 weight percent of a polymer compatibilizer which contains from about 0.05 to 4.0 mole percent of a comonomer containing a functional group which reacts with the polyamide resin is useful for molding and extrusion.

5 Claims, No Drawings

RUBBER MODIFIED NYLON COMPOSITION

This application is a continuation of Ser. No. 07/363,341 filed Jun. 2, 1989 abandoned), which is a continuation of Ser. No. 07/132,234 filed Dec. 14, 1987 (abandoned), which is a division of Ser. No. 06/842,338 filed Mar. 21, 1986 (issued as U.S. Pat. No. 4,713,415), which is a continuation-in-part of Ser. No. 06/733,560 filed May 10, 1985 (abandoned).

This invention relates to thermoplastic polyamide compositions and more particularly to polyamide compositions having improved impact resistance.

Unmodified thermoplastic polyamides are generally regarded as having good elongation and good energy to break as demonstrated in tensile tests and high tensile impact strength and high energy absorption as demonstrated in a falling dart test, e.g, the Gardner impact test. However, the polyamides are quite deficient in resistance to crack propagation. This deficiency is reflected in notch sensitivity, brittle breaks and occasional catastrophic failure of molded extruded parts. The tendency of polyamides to break in a brittle rather than a ductile fashion is a significant limitation of their end use applications.

A variety of additives have been added to polyamides with some improvement in toughness being obtained. Epstein (U.S. Pat. No. 4,174,358) discloses a toughened multiphase thermoplastic composition consisting essentially of a polyamide matrix and at least one other phase containing straight chain and branched chain polymers having a particle size in the range of 0.01 to 1.0 micrometers which adhere to the polyamide matrix resin and which also have tensile modulus in the range of about 1.0 to 20,000 psi (6.9 to 137,800 kPa).

Epstein has the disadvantage of requiring that its branched and straight chain polymers be functionalized to adhere to the polyamide matrix, thereby excluding the use of conventional polymers or rubbers which do not contain functional groups. In addition, the functionalization of the polymers may result in cross-linking which results in poor processability properties if conditions are not properly controlled.

German Patent Publication DE3120-803 discloses thermoplastic polyamide molding compositions comprising a polyamide, a graft rubber composition, styrene-acrylonitrile copolymer and a styrene copolymer with 2 to 50 weight percent of carboxylic acid and/or anhydride groups. Such compositions provide some increase in Izod impact of a nylon composition, however, the improvements are less than can be achieved with the present invention.

The present invention provides a polymeric composition and molded or extruded parts prepared from the composition comprising a blend of components:

(A) 5 to 79.5 weight percent of a graft rubber composition comprising a graft copolymer of from 15 to 85 parts by weight of a monomer selected from the group consisting of $C_1$ to $C_4$ alkyl acrylates, $C_1$ to $C_4$ alkyl methacrylates, methacrylonitrile and acrylonitrile and from 85 to 15 parts by weight of a vinylaromatic monomer, wherein the monomers are polymerized in the presence of and grafted onto a rubber substrate having a glass transition temperature below 0° C., wherein the weight percentage of the rubber is in the range from 5 to 80 percent and the weight percentage of the graft copolymer is in the range of 95 to 20 percent of the graft rubber composition;

(B) 94.5 to 20 weight percent of a polyamide resin; and (C) 0.5 to 60 weight percent of a copolymer compatibilizer comprising a copolymerized functionalized monomer capable of reaction with the polyamide resin, wherein the concentration of functional groups of the copolymer is in the range of 0.05 to 4 mole percent. The percentage weights of components A, B and C are based on the total weight of components A, B and C in the blend. Preferably the amounts of components A, B and C are in the range of 20 to 79, 79 to 20 and 1 to 60 weight percent, respectively, of the total weight of A, B and C.

Component A is typically an ABS or MBS type polymer, that is to say a diene rubber substrate grafted with a vinylaromatic monomer and either acrylonitrile, methacrylonitrile, a $C_1$ to $C_4$ alkyl methacrylate, a $C_1$ to $C_4$ alkyl acrylate or a mixture conventionally a diene rubber such as polybutadiene, polymers of butadiene with a comonomer such as styrene or acrylonitrile which rubber contains at least 50 percent and preferably at least 80 percent by weight of butadiene or a butadiene based block or radial-block rubber. However the rubber need not be a conventional polybutadiene or butadiene/styrene copolymer since any rubber with a glass transition temperature below 0° C. can be used. The glass transition temperature is conveniently measured by differential thermal analysis by heating a rubber sample under nitrogen at a rate of 10° C. per minute. Other rubbers such as EPDM rubber, polypentenamer, polyisoprene, polychloroprene, polyacrylate rubbers and the like can, if desired, also be used. Preferably polyacrylate rubbers contain a minor amount up to 5 weight percent of an interpolymerized monomer such as allyl acrylate to provide unsaturation and enhance grafting thereto.

Vinylaromatic monomers used for the graft copolymer of component A include styrene, and substituted styrenes such as alpha-methyl styrene, chlorostyrene, bromostyrene, p-methyl styrene, and vinyl toluene. The weight ratio of vinylaromatic monomer to comonomer in the graft copolymer of component A is preferably in the range of 20:80 to 80:20 and the weight percent of the rubber is in the range of 5 to 60 percent of the total weight of the graft rubber composition. When the vinylaromatic monomer is styrene and the comonomer is acrylonitrile, a more preferred weight ratio of styrene to acrylonitrile is in the range of 80:20 to 50:50. The ratio of comonomers of the graft copolymer is preferably selected so that the ungrafted copolymer fraction has a tensile modulus of at least 25,000 psi, more preferably at least 50,000 psi. Advantageously graft polymerization conditions are selected to provide a grafted copolymer fraction, i.e., graft efficiency of at least 20 weight percent and preferably at least 40 weight percent of the total copolymer present in the graft rubber composition, and provided the grafted copolymer fraction is maintained above 20 weight percent, the graft copolymer may be diluted by addition of separately prepared copolymer of vinyl aromatic monomer and comonomer selected from the group consisting of acrylonitrile, methacrylonitrile, $C_1$ to $C_4$ alkyl acrylates and $C_1$ to $C_4$ alkyl methacrylates. Graft polymerization conditions are advantageously selected to provide a copolymer of weight average molecular weight less than 200,000 and preferably less than 150,000 measured on the ungrafted fraction by gel permeation chromatography as hereinafter described. The particle size of the rubber graft composition is advantageously in the range of 0.05 to 1.0 microns, preferably 0.1 to 0.5 microns.

Component B is a polyamide such as nylon 6 or poly(caprolactam), nylon 11 or poly(11-aminoundecanoic acid), nylon 12 or poly(lauryl lactam) or poly(12-aminododecanoic acid), nylon 6,6 or poly(hexamethylene adipamide), nylon 6,9 or poly(hexamethylene azelamide) or poly(hexamethylene nonandiamide), nylon 6,10 or poly(hexamethylene sebacamide) or poly(hexamethylene decanediamide), nylon 6,12 or poly(hexamethylene dodecanodiamide) or nylon 4 or poly(Y-butyrolactam), nylon 7 or poly(7-aminoheptanoic acid) or poly(7-aminooenanthylic acid), nylon 8 or poly(8-aminocaprylic acid) or poly(8-aminooctanoic acid), nylon 10,6 or poly(decamethylene adipamide) and numerous partially aromatic nylons (PARNs). PARNs result when an aromatic residue or unit is substituted in whole or in part for an aliphatic residue or unit in an aliphatic nylon polymer. For example, substitution of all of the adipic acid [HOOC—(CH$_2$)$_4$—COOH] residues in nylon 6,6 by those from mixtures of about 30–60 percent terephthalic acid (TA, or p-HOOC—C$_6$H$_4$—COOH)/70–40 percent isophthalic acid (IA, or m-HOOC-C$_6$H$_4$—COOH) gives suitable PARNs which are high-melting, partly crystalline nylons 6,TA-co-6, IA or poly(hexamethylene tere-co-isophthalamides). Other suitable PARNs are partly crystalline nylons 6,6-co-6,-TA, nylons 6,6-co-6,IA, nylons 6,6-co-6,-TA-co-6,IA, and other similar PARNs, including partly crystalline PARNs wherein some of the diamine residues have aromatic character and those containing lactam residues, such as nylons 6-co-6,6-co-6,TA. The weight average molecular weight of the polyamide is advantageously greater than 10,000 and is preferably greater than 20,000.

Also suitable are various types of copolyamides, block copolymers, and graft copolymers. The preferred polyamide resins are nylon 6, nylon 6,6 and random copolymers of nylon 6,6 and nylon 6.

Polyamides are generally neither miscible nor compatible with hydrocarbon polymers such as polystyrene and ABS. In the generally accepted sense, two polymers are miscible when they form a single phase, solid solution. Miscibility of a blend of polymers may be confirmed by a single Tg for the polyblend, measured by calorimetry or dynamic mechanical analysis, or by optical clarity of the polyblend. When two polymers exhibit different Tgs or loss tangent peaks, they demonstrate immiscibility by forming two phases in a blend, each of which retains the Tg or loss tangent peak of one of the pure components. Partially miscible blends exhibit shifted or broadened loss tangent peaks relative to the individual pure components. When two polymers are compatible, a mixture provides a stable blend possessing a useful balance of mechanical properties exhibited especially by impact strength or tensile elongation to fail equal or superior to such properties for the component which provides the continuous phase in the mixture. By contrast, when two polymers are incompatible, the mixture exhibits generally poor mechanical properties, especially impact strength or tensile elongation to fail, which are lower than for the component which provides the continuous phase in the mixture. Incompatibility may be manifested during processing, for example, molding and extrusion, by extensive phase separation resulting in layering of the polymers and delamination under mild stress.

The present invention yields blends of polyamides and graft polymer of the ABS type that form compatible mixtures, i.e., stable mixtures comprising a micro dispersion of a minor amount of one polymer in a continuous phase of a major amount of the other and results in polymer blends of generally improved balance of mechanical properties especially toughness demonstrated by higher impact strength and elongation to fail. When about equal amounts of polyamide and ABS are blended, uniformly interspersed coextensive phases are formed in the mixture which also possesses generally improved, mechanical properties. Such compatible blends of polyamides and grafted rubbers, such as ABS, are obtained by the use of the C component which acts as a compatibilizing polymer or "compatibilizer."

In the present invention, the structure of the C component compatibilizer is such that it meets several criteria:

1. the compatibilizer is at least partially miscible and preferably fully miscible with the graft copolymer of the grafted rubber component A;

2. the compatibilizer contains functional groups capable of reacting with the amine or acid end groups of the polyamide. An example is the anhydride-amine reaction that occurs when maleic anhydride is present as a copolymerized portion of the compatibilizer molecule and reacts with the terminal amine group in the polyamide molecule upon processing of the polymer blend;

3. the amount of reactive functionality in the compatibilizer is small and is advantageously in the range of about one to ten functionalities per average compatibilizer molecule.

Component C is typically a copolymer of a vinylaromatic monomer of the type in component A copolymerized with either acrylonitrile, methacrylonitrile, C$_1$ to C$_4$ alkyl methacrylate, C$_1$ to C$_4$ alkyl acrylate or a mixture of these monomers in a weight ratio of vinylaromatic monomer to comonomer in the range of 85:15 to 15:85. Advantageously component C has a number average molecular weight of at least about 21,000 and preferably at least about 30,000 and a weight average molecular weight of at least about 40,000 and preferably at least about 60,000. The molecular weights are conveniently measured by gel permeation chromatography as described hereinafter. While in principle the molecular weight can be extremely high, it is advantageous to have a weight average less than 200,000 to provide ease of processing and blending with the other components of the polyblend and preferably less than 100,000. Component C contains from about 0.05 to about 4.0 mole percent of a copolymerized comonomer containing a functional group which reacts with the amine or carboxylic acid groups of the polyamide and preferably from about 0.1 to about 3 mole percent, preferably selected to provide a concentration of functional group in the range of 1 to 10 functional groups per average molecule of component C. The vinylaromatic polymer may be functionalized by polymerizing the vinylaromatic monomer with monomers containing a carboxylic acid such as acrylic or methacrylic acid or C$_1$ to C$_{12}$ monalkyl esters of diacids such as monomethyl maleate and mono-dodecyl fumarate, a dicarboxylic acid such as fumaric acid, maleic acid, itaconic acid, aconitic acid or citraconic acid, an anhydride, such as maleic, itaconic, aconitic or citraconic anhydride, or with an epoxide such as glycidyl acrylate, glycidyl methacrylate or allyl glycidyl ether or other monomers containing similar functional groups. The preferred component C is a terpolymer containing styrene, α-methylstyrene or p-methylstyrene, acrylonitrile and from about 0.1 to about 3.0 mole percent maleic anhydride. With such a terpolymer miscibility with the graft copolymer of the rubber graft component A is obtained when the graft copolymer also comprises styrene, α-methyl styrene or p-methyl styrene and acrylonitrile and the weight percentage of the styrene monomer in the graft copolymer differs from the weight percentage of styrene monomer in component C by no more than ±5 units. Preferably the same styrene monomer is selected for terpolymer C and the graft copolymer of component A. A more preferred component C is a styrene-acrylonitrile-maleic anhydride terpolymer containing from about 0.3 to about 1.5 mole percent maleic anhydride and the most preferred contains about 1 mole percent maleic anhydride. The styrene monomer:acrylonitrile weight ratio in component C is in the range of 85:15 to 15:85 and is preferably in the range of 80:20 to 50:50.

The preferred amount of component C in the polyblend is in the range of 1 to 20 weight percent. A more preferred amount of component C in the polyblend is in the range of 4 to 12 weight percent and even more preferred is the range of 6 to 10 weight percent.

In addition to the above components the polyblends of the invention can advantageously contain other additives such as plasticizers, antioxidants, stabilizers, flame-retardants, fibers, mineral fibers, mineral fillers, dyes, pigments and the like.

The components of the polyblend can be blended together by any convenient process. Usually however they are extrusion blended or compounded in a high intensity blender such as a Banbury Mixer.

The invention is now described with reference to the following examples which are for the purposes of illustration only and are not intended to imply any limitation on the scope of the invention. The components described below are blended in a number of different ratios and tested for various properties.

COMPONENTS USED

ABS-1 - prepared by the graft emulsion polymerization of styrene and acrylonitrile in a weight ratio of 70:30 in the presence of polybutadiene. ABS-1 contains 40 percent by weight of polybutadiene. The weight average molecular weight of the ungrafted SAN polymer fraction determined on several different batches of the styrene/acrylonitrile graft polymer by gel permeation chromatography (GPC) is in the range from 75,000 to 150,000. ASTM Method D 3536-76 is used in GPC, modified in that four columns in series using micro Styragel TM (a trademark of Waters Assoc.) packing are used with a nominal exclusion limit of 5,000 nm, 10,000 nm, 100,000 nm and 1,000,000 nm. The detector is an ultraviolet light detector set at wavelength 254 nm. The test samples are prepared at a concentration of 0.25 weight percent of polymer in tetrahydrofuran. The sample injection size is 0.2 ml and a flow rate of 2 ml/min. at ambient temperature is used.

The grafted polybutadiene has an average particle size in the range of from 0.1 to 0.25 micrometer measured as a weight average particle size diameter with centrifugal photosedimentometer (CPSM) by the published procedure of Graves, M. J. et al "Size Analysis of Subsieve Powders Using a Centrifugal Photosedimentometer", British Chemical Engineering 9:742-744 (1964). A Model 3000 Particle Size Analyzer from Martin Sweets Co., 3131 W. Market St., Louisville, KY is used.

The ABS polymer is recovered from the emulsion by conventional coagulation, filtration and washing.

ABS-2 is prepared by the graft emulsion polymerization of styrene and acrylonitrile in a weight ratio of 70:30 in the presence of polybutadiene-styrene (90:10) copolymer, and contains 60 percent by weight butadiene-styrene copolymer. The grafted copolymer has an average particle size in the range 0.37 to 0.43 micrometer as measured by CPSM as described above. The weight average molecular weight of representative batches is in the range of 75,000 to 150,000.

ABS-3—the same as ABS-1 except that the ratio of styrene to acrylonitrile is 45:55.

Nylon-1—a random copolymer of 85 weight percent nylon 6,6 polymer (poly[hexa-methylene adipamide]) and 15 weight percent nylon 6 (polycaprolactam).

Nylon-2—a nylon 6,6 polymer.

Nylon-3—a nylon 6,9 polymer. The weight average molecular weights of the nylons are in the range of 30,000 to 34,000.

Terpolymer-1—a terpolymer is prepared by polymerizing a monomer mixture to provide a polymer containing a weight ratio of styrene to acrylonitrile of about 2.1:1 and a varied amount of maleic anhydride. The weight average molecular weight is in the range from about 60,000 to 100,000 measured by GPC as described above.

Terpolymer-2—a terpolymer prepared by polymerizing a monomer mixture of styrene, maleic anhydride and methyl methacrylate to produce a composition in which the above monomers are in the weight ratio of 72:22:6 respectively. The weight average molecular weight is approximately 150,000.

SAN is prepared by polymerizing a monomer mixture of styrene and acrylonitrile to produce a SAN polymer having a weight ratio of 76:24. The weight average molecular weight is approximately 100,000.

WORKING EXAMPLES AND TEST RESULTS

In each example and control example, one percent Ethanox TM 330 antioxidant, an alkylated phenol available from Ethyl Corporation, is added based on the total weight of the sample.

Izod impact is measured according to ASTM D-256-56 with results given in joules/meter (J/m).

Flex Modulus is measured according to ASTM D-790-66. The sample is 0.635 cm × 1.27 cm with a span of 10.16 cm and a 1.27 cm per second cross-head rate. The results are given in megapascals (MPa).

Tensile Yield is measured according to ASTM D-638 with results given in megapascals (MPa).

Multiaxial Inverted Dart Impact (IDI) is measured according to a modification of the test described in Society of Plastics Engineers National Technical Conference "Plastics in Surface Transportation" Nov. 12-14, 1974 Detroit, Mich., page 238. In the modified test, instead of the dart being attached to the slider and striking the sample, the sample holder is attached to the slider and strikes the instrumented dart. The rotary potentiometer is not used. The instrumented dart used is 1.27 cm in diameter, and the sample strikes the instrumented dart at a velocity of 111.76 m/min. The samples are injection molded into 7.62 cm × 10.16 cm × 0.254 cm and then are cut into 3.81 cm × 5.08 cm × 0.254 cm pieces for testing. The results are given in joules (J).

The IDI energy to maximum ($E_{max}$) is the energy needed to achieve the yielding of a ductile sample. The energy to failure ($E_{fail}$) represents the energy necessary to cause a failure of a sample. The test is run at room temperature and at $-20°$ C. to determine the effect of temperature on the performance of the polymer. The difference between $E_{fail}$ and $E_{max}$ indicates the ductility of the sample and the difference increases with ductility.

The polymer blends of each example are physically blended by an extrusion process. This involves a preblending step of physically mixing the ABS, terpolymer and antioxidant and feeding the mixture into a Killion extruder possessing a single stage mixing screw (3.8 cm in diameter by 68.6 cm long) which is rotated at from about 101 to about 103 revolutions per minute (RPM). The rear zone of the extruder is heated to 254° C. with the middle and front zones heated to 260° C. The extruder is connected to a die with a single 0.318 cm diameter orifice through a 0.04 cm to 0.06 cm opening screen pack. The die is heated to 254° C. The extruded material is passed through a water bath and pelletized by a Dayton pelletizer. The rate of extrusion is 4.55 kgs per hour.

The pelletized preblended material of each example is then physically mixed with the nylon and the mixture fed into the Killion extruder wherein the extrusion process is repeated as described above, except that the rate of extrusion is 7.26 kgs per hour. The pelletized blended material is then injection molded into specimen bars for testing according to the procedures as set forth above with the testing results concurrently listed for each example in Tables 1 to 5. The injection molding is conducted using a 28.3 g Arburg ™ 200 "S" allrounder molding machine available from Arburg Machinenfabrik in Wurttemburg, Germany, possessing a general purpose screw with a check ring and a straight through nozzle. The molding conditions are as follows:

| 1. Temperatures: | Rear Zone | 260° C. |
| --- | --- | --- |
|  | Center Zone | 260° C. |
|  | Front Zone | 260° C. |
|  | Nozzle | 260° C. |
|  | Mold | 43° C. |
| 2. Screw Speed: | 94 rpm |  |
| 3. Injection Rate: | 1.3 seconds |  |
| 4. Hold and Cooling Times: | 25-35 seconds |  |
| 5. Hydraulic Pressures: | Injection | 5512 kPa |
|  | Hold | 4823 kPa |
|  | Back | 344 kPa |

EXAMPLES 1 TO 4 AND CONTROLS 1 AND 2

Examples 1 to 4 and Controls 1 and 2, shown in Table 1, illustrate the effect of varying the amount of maleic anhydride (MA) in the terpolymer. A sharp optimum in Izod is seen between 0.2 and 5.0 percent MA in the terpolymer. The maximum Izod is observed at 1.0 percent MA as seen in Example 3 which has a tensile yield of 40.87 MPa, a flex modulus of 1805 MPa, an IDI $E_{max}$ at 23° C. of 21.7J, $E_{fail}$ at 23° C. of 41.8J, $E_{max}$ at $-20°$ C. of 26.0J and an $E_{fail}$ at $-20°$ C. of 44.0J, which indicates a tough, ductile polymer.

EXAMPLES 5 TO 10 AND CONTROL 3

Examples 5 to 10 and Control 3, shown in Table 2, illustrate the effect of the amount of terpolymer in the blend on Izod performance.

EXAMPLES 11 TO 13 AND CONTROL 4

Examples 11 to 13 and Control 4, shown in Table 3, show that ABS polymers with varying acrylonitrile content can be effectively used in the present polyblend.

EXAMPLES 14 TO 17 AND CONTROL 5

Examples 14 to 17 and Control 5, given in Table 4, show that the nylon content of the polyblend can be lowered and still be effective to give an improvement in Izod.

EXAMPLES 18 TO 20

Examples 18 to 20 given in Table 5 show that a variety of nylons are suitable for the present polyblends.

TABLE 1

EFFECT OF MA CONTENT IN TERPOLYMER ON IMPACT STRENGTH OF POLYBLEND

|  | Ex 1 | Ex 2 | Ex 3 | Ex 4 | Control 1 | Control 2 |
| --- | --- | --- | --- | --- | --- | --- |
| ABS-1 | 50 | 50 | 50 | 50 | 50 | 50 |
| Terpolymer-1 | 6 | 6 | 6 | 6 | 6 | 6* |
| Nylon-1 | 44 | 44 | 44 | 44 | 44 | 44 |
| mole % MA in Terpolymer | 0.2 | 0.5 | 1.0 | 1.5 | 5.0 | 22 |
| Izod | 125 | 591 | 851 | 466 | 50.4 | 53.1 |

*Terpolymer-2

TABLE 2

EFFECT OF VARYING AMOUNT OF TERPOLYMER ON IMPACT STRENGTH OF POLYBLEND

|  | Control 3 | Ex 5 | Ex 6 | Ex 7 | Ex 8 | Ex 9 | Ex 10 |
| --- | --- | --- | --- | --- | --- | --- | --- |
| ABS-1 | 50 | 50 | 50 | 50 | 50 | 50 | 50 |
| Terpolymer-1 | 0 | 1 | 3 | 6 | 10 | 15 | 20 |
| Nylon-1 | 50 | 49 | 47 | 44 | 40 | 35 | 30 |
| mole % MA in Terpolymer | 0 | 1 | 1 | 1 | 1 | 1 | 1 |
| Izod | 75.9 | 146 | 233 | 851 | 591 | 320 | 211 |

TABLE 3

IMPACT STRENGTH OF POLYBLENDS CONTAINING DIFFERENT ABS POLYMERS

|  | Control 4 | Ex 11 | Ex 12 | Ex 13 |
| --- | --- | --- | --- | --- |
| ABS* | 33 | 33 | 50 | 50 |
| Terpolymer-1 | 0 | 4 | 10** | 10 |
| Nylon-1 | 63 | 63 | 40 | 40 |
| SAN | 4 | 0 | 0 | 0 |
| mole % MA in Terpolymer | 0 | 1 | 1 | 1 |

*ABS-Type  ABS-2  ABS-2  ABS-3  ABS-1
Izod        60.7   103.0  168    201
**The weight ratio of styrene to acrylonitrile is 0.43

TABLE 4

LOW NYLON BLENDS POLYBLENDS CONTAINING 20 WT. % NYLON

|  | Control 5 | Ex 14 | Ex 15 | Ex 16 | Ex 17 |
| --- | --- | --- | --- | --- | --- |
| ABS-1 | 80 | 74 | 70 | 65 | 60 |
| Terpolymer-1 | 0 | 6 | 10 | 15 | 20 |
| Nylon-1 | 20 | 20 | 20 | 20 | 20 |
| mole % MA in Terpolymer |  | 1 | 1 | 1 | 1 |
| Izod | 100 | 510 | 535 | 544 | 549 |

TABLE 5

| POLYBLENDS CONTAINING DIFFERENT NYLONS | | | |
|---|---|---|---|
| | Ex 18 | Ex 19 | Ex 20 |
| Nylon-1 | 45 | | |
| Nylon-2 | | 45 | |
| Nylon-3 | | | 45 |
| ABS-1 | 50 | 50 | 50 |
| Terpolymer-1 | 5 | 5 | 5 |
| mole % MA in Terpolymer | 1 | 1 | 1 |
| Izod | 850 | 288 | 426 |

We claim:

1. A polymer blend exhibiting notched Izod impact resistance determined in accordance with ASTM D-256-56 of greater than 100 Joules per meter, said blend consisting of:
   (A) 5 to 79.5 weight percent of a graft rubber composition comprising copolymer grafted to a rubber substrate having a glass transition temperature less than 0° C., wherein said copolymer consists of (i) 15 to 55 parts by weight of $C_1$ to $C_4$ alkyl(meth)acrylate or acrylonitrile monomer and (ii) 85 to 45 parts by weight of tyrene monomer, wherein said graft rubber composition comprises 20 to 95 parts by weight to said copolymer and 80 to 5 parts by weight of said rubber;
   (B) 94.5 to 20 weight percent of a polyamide resin; and
   (C) 0.5 to 60 weight percent of a compatibilizer polymer of styrene monomer, $C_1$ to $C_4$ alkyl(meth)acrylate or acrylonitrile monomer and 0.5 to 4 mole percent of a functionalized monomer capable of reaction with the polyamide resin, wherein the weight percentage of styrene monomer in the graft copolymer of component A differs from the weight percentage of styrene monomer in the compatibilizer copolymer of component C by no more than 5 units; and wherein said percentages of components A, B and C are based on the total weight of components A, B and C in the blend.

2. A blend according to claim 1 wherein said functionalized monomer capable of reaction with the polyamide resin is a carboxylic acid, anhydride or ester.

3. A blend according to claim 2 wherein said graft rubber composition comprises a copolymer of styrene and acrylonitrile grafted to a butadiene rubber.

4. A blend according to claim 3 wherein said compatibilizer copolymer is a terpolymer of styrene, acrylonitrile and maleic anhydride having a styrene:acrylonitrile weight ratio int he range of 80:20 to 50:50.

5. A blend according to claim 4 wherein said copolymer of styrene and acrylonitrile grafted to butadiene comprises about 70 to 76 weight percent styrene.

* * * * *